United States Patent
Woodmansee et al.

(10) Patent No.: US 8,059,567 B1
(45) Date of Patent: Nov. 15, 2011

(54) DISTRIBUTING MOBILE STATIONS ACROSS CARRIERS OF PLURAL FREQUENCY BANDS

(75) Inventors: Michael P. Woodmansee, Plano, TX (US); Farhad Bassirat, Plano, TX (US)

(73) Assignee: Ericsson AB, Stockholm (SE)

( * ) Notice: Subject to any disclaimer, the term of this patent is extended or adjusted under 35 U.S.C. 154(b) by 1137 days.

(21) Appl. No.: 11/824,126

(22) Filed: Jun. 29, 2007

Related U.S. Application Data

(60) Provisional application No. 60/817,645, filed on Jun. 29, 2006, provisional application No. 60/817,646, filed on Jun. 29, 2006.

(51) Int. Cl.
*H04B 7/005* (2006.01)
*H04Q 7/00* (2006.01)

(52) U.S. Cl. .......... 370/278; 370/331
(58) Field of Classification Search .......... 370/277, 370/278, 328–332, 335, 342, 343, 480, 481
See application file for complete search history.

(56) References Cited

U.S. PATENT DOCUMENTS

| | | | |
|---|---|---|---|
| 6,167,253 A * | 12/2000 | Farris et al. | 455/412.2 |
| 6,965,587 B2 * | 11/2005 | Cho et al. | 370/335 |
| 7,012,893 B2 * | 3/2006 | Bahadiroglu | 370/231 |
| 7,623,880 B2 * | 11/2009 | Sinnarajah et al. | 455/509 |
| 7,689,227 B2 * | 3/2010 | Gholmieh et al. | 455/452.1 |
| 2001/0048674 A1 * | 12/2001 | Cho et al. | 370/335 |
| 2002/0159513 A1 * | 10/2002 | Williams et al. | 375/222 |
| 2003/0032430 A1 * | 2/2003 | Lee | 455/436 |
| 2003/0174674 A1 * | 9/2003 | Lee et al. | 370/331 |
| 2003/0203735 A1 | 10/2003 | Andrus et al. | |
| 2004/0167978 A1 * | 8/2004 | Kitayama | 709/224 |
| 2006/0094437 A1 * | 5/2006 | Sinnarajah et al. | 455/452.1 |
| 2006/0281466 A1 * | 12/2006 | Gholmieh et al. | 455/450 |
| 2007/0070945 A1 * | 3/2007 | Wang et al. | 370/329 |

* cited by examiner

*Primary Examiner* — Hong Cho
(74) *Attorney, Agent, or Firm* — Coats & Bennett, P.L.L.C.

(57) ABSTRACT

Distribution of mobile stations across carriers of multiple frequency bands is achieved by using either a static distribution mechanism or a dynamic distribution mechanism. With the static distribution mechanism, a combination of a redirection message and a channel list is employed. With the dynamic distribution mechanism, the use of redirection messages is enabled on a dynamic basis for a predefined time interval.

20 Claims, 2 Drawing Sheets

DISTRIBUTING MOBILE STATIONS ACROSS CARRIERS OF PLURAL FREQUENCY BANDS

CROSS-REFERENCE TO RELATED APPLICATION

This claims the benefit under 35 U.S.C. §119(e) of U.S. Provisional Application Ser. No. 60/817,646, entitled "Support of Idle Traffic Hashing Across Bands for CDMA IS-2000," filed Jun. 29, 2006, and of U.S. Provisional Application Ser. No. 60/817,645, entitled "Dynamic Auto-GSR Idle Traffic Across Bands for CDMA IS-2000," filed Jun. 29, 2006, which are both hereby incorporated by reference.

TECHNICAL FIELD

The invention relates generally to distributing mobile stations across carriers of plural frequency bands.

BACKGROUND

In a mobile or wireless communications network, many mobile stations can be competing for shared resources. Shared resources can include carriers of a frequency band used in the wireless communications network. In some applications, to support increasing demands on the capacity of a wireless communications network, additional frequency bands have been added to the wireless communications network. The term "frequency band" as used here refers to and encompasses a "frequency band class." Examples of different frequency band classes include an 800 MHz (megahertz) frequency band class (also referred to as "band class 0") and a 1900 MHz frequency band class (also referred to as "band class 1").

A challenge of having multiple frequency bands in a wireless communications network, such as a code-division multiple access (CDMA) 2000 network, is maintaining an even (or substantially even) distribution of mobile stations across carriers of the multiple frequency bands. Certain conventional techniques exist to distribute mobile stations that are making channel access requests across frequency bands. However, effective distribution techniques have not been provided to distribute idle state mobile stations across frequency bands. An imbalance of idle state mobile stations across multiple frequency bands can lead to certain frequency bands being overloaded with traffic of the idle state mobile stations, which can degrade performance of the wireless communications network.

SUMMARY

In general, according to an embodiment, a method for use in a wireless communications network having plural frequency bands includes identifying, in each of the plural frequency bands, a predefined subset of carriers in the corresponding frequency band over which redirection messages are to be sent to cause idle state mobile stations to transfer between frequency bands to provide for an even or desired distribution of idle state mobile stations across carriers of the plural frequency bands.

In general, according to another embodiment, a base station includes an interface to mobile stations, and a processor to detect a load condition of a carrier communicated between the base station and the mobile stations. In response to detecting the load condition crossing a threshold, the base station enables transmission of redirection messages for a predefined time interval.

Other or alternative features will become apparent from the following description, from the drawings, and from the claims.

DETAILED DESCRIPTION

Figure 1:
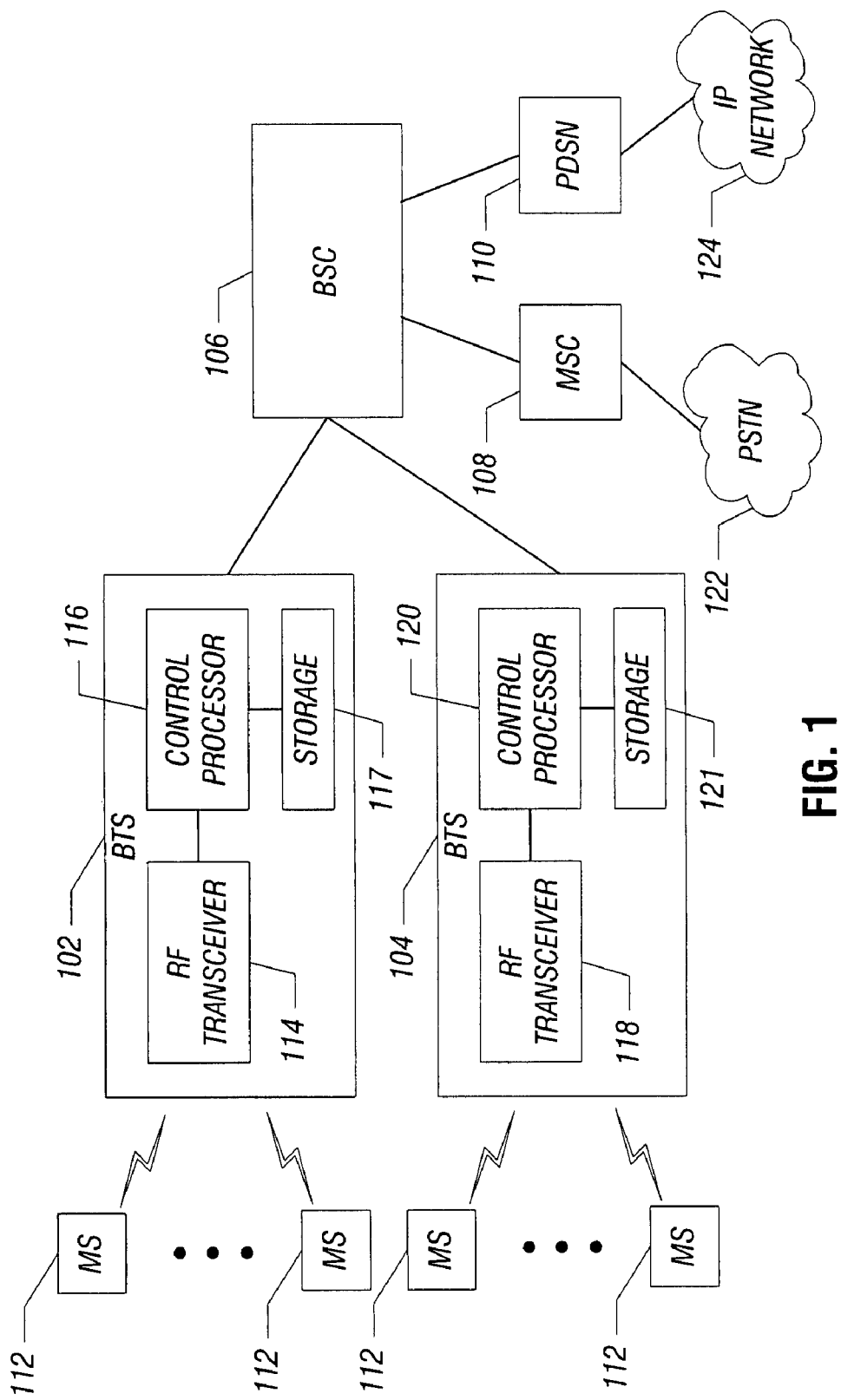
FIG. 1 is a block diagram of an example communications network that includes a wireless communications network, in which some embodiments of the invention can be incorporated.

In the following description, numerous details are set forth to provide an understanding of some embodiments. However, it will be understood by those skilled in the art that some embodiments may be practiced without these details and that numerous variations or modifications from the described embodiments may be possible.

A mobile or wireless communications network, such as a CDMA2000 network, can be deployed with multiple frequency bands in high-capacity geographic regions, such as university campuses, stadiums, convention centers, high-rise office buildings, and so forth. As noted above, "frequency band" as used here refers to and encompasses "frequency band class." Each frequency band has a number of carriers having different frequencies within a range associated with the corresponding frequency band. The numbers of carriers in the multiple frequency bands can differ. In one implementation, at least one band has more carriers than at least another band. In one example, a first frequency band is the 800 MHz (megahertz) band (band class 0), and a second frequency band is the 1900 MHz band (band class 1). However, in other implementations, other frequency bands can be used.

It is desirable to avoid imbalance in the amount of traffic communicated by mobile stations in the multiple frequency bands. "Traffic" can refer to either one, or both of, control-related data or bearer data. An imbalance in the amount of traffic in the frequency bands can cause some frequency band(s) to be overloaded, which can adversely affect performance of the mobile communications network.

Even more particularly, a challenge faced by mobile communications networks is the proper distribution of mobile stations that are in idle state (referred to as "idle state mobile stations") across the carriers of the multiple frequency bands. A mobile station in an idle state does not mean that the mobile station is not communicating traffic. In fact, as discussed further below, the mobile station in idle state can actually be quite active in communicating various control-related traffic.

If an excessive number of idle state mobile stations select carriers of a particular frequency band for communications, then irresolvable contention for access channels in the particular frequency band can occur. Note that an access channel is used by a mobile station to originate a call session, to respond to a page, or to perform registration. Contention can prevent proper communication of requests or responses of mobile stations transmitted over an access channel.

A mobile station has several states, including the idle state referenced above, as well as an initialization state, a system access state, and a state when the mobile station is using a traffic channel. When a mobile station powers up, it transitions to the initialization state to synchronize with the mobile communications network and to perform various initialization tasks. The mobile station then enters the idle state, in which the mobile station monitors a paging channel or a forward common control channel (F-CCH) to receive various messages, such as a page message to indicate an incoming call, or an overhead message. In the system access state, the mobile station sends messages to the base station on an access channel.

In accordance with some embodiments, distributing a mobile station (such as an idle state mobile station) across multiple frequency bands can be according to one of two mechanisms: (1) a static distribution mechanism in which a combination of redirection messages, e.g., global service redirection (GSR) messages, and channel lists are used; and (2) a dynamic distribution mechanism in which redirection messages, e.g., GSR messages, are dynamically turned on or off based on a detected load condition.

The GSR message and channel list are defined by the CDMA2000 standards. Note that although reference is made to "GSR message," it is contemplated that such reference is also intended to cover an enhanced GSR message as defined by CDMA2000. More generally, reference is made to a "redirection message" to refer to a message that is used to cause a mobile station to move (transfer) between different carriers, which can be carriers of the same frequency band or carriers of different frequency bands. Moreover, although reference is made to CDMA2000, it is contemplated that techniques according to some embodiments can also be applied to mobile communications networks compliant with other wireless network standards.

A channel list refers to a list of available channels (carriers) supported by a particular base station selectable by a mobile station in an idle state to use for communicating idle state traffic. In some implementations, the selection of an available carrier from the channel list is based on application of a hashing function (performed at the mobile station) on the channel list. An identifier of the mobile station, such as its international mobile subscriber identity (IMSI), or its mobile identification number (MIN), can be provided as input to the hash function. Application of the hash function on the channel list allows for the mobile station to be distributed in a desired manner across available carriers specified in the channel list.

FIG. 1 illustrates an example communications system that includes a mobile communications network. The mobile communications network includes base transceiver stations (BTSs) 102 and 104, a base station controller (BSC) 106, a mobile switching center (MSC) 108, and a packet data serving node (PDSN) 110. It is noted that a mobile communications network usually includes more than two BTSs and can include multiple BSCs.

A BTS is equipment that performs wireless communication with user equipment, in this case mobile stations 112. The multiple BTSs 102, 104 depicted in FIG. 1 are provided to cover different cell sites. As depicted in FIG. 1, the BTS 102 includes a radio frequency (RF) transceiver 114 to communicate RF signaling with mobile stations 112 in the coverage area of the BTS 102. The BTS 102 also includes a control processor 116 that performs control tasks associated with the BTS 102. As discussed further below, some of the control tasks performed by the BTS 102 include transmission of channel lists and GSR messages to the mobile stations. The BTS 102 further includes a storage 117.

The other BTS 104 similarly includes an RF transceiver 118, a control processor 120, and a storage 121.

The BSC 106 performs additional control tasks associated with call establishment involving the mobile stations 112 in the mobile communications network. In some cases, a BSC and BTS can be combined. In the ensuing discussion, reference is made to a "base station," where "base station" is intended to refer to either the BTS individually or a combination of a BTS and a BSC.

The BSC 106 is connected to the MSC 108, which is a circuit-switched exchange to enable circuit-switched call sessions to be established between mobile stations 112 and a network entity connected to a circuit-switched network such as a public switched telephone network (PSTN) 122.

The BSC 106 is also connected to the PDSN 110 to enable establishment of packet-switched communications sessions between mobile stations 112 and a network entity connected to a packet-switched network, such as an Internet Protocol (IP) network 124.

The mobile communications network of FIG. 1 can support multiple frequency bands, where each frequency band includes a number of carriers. To distribute mobile stations 112 across carriers of multiple frequency bands, a base station is able to use either a static distribution mechanism or a dynamic distribution mechanism.

The static distribution mechanism involves the base station identifying a predefined subset of carriers within each frequency band over which a redirection message (e.g., GSR message) can be transmitted to mobile stations. In one example, the subset of carriers within each frequency band over which a redirection message can be transmitted includes just one carrier.

Table 1 illustrates an example of the static distribution mechanism. In the example of Table 1, it is assumed that the multiple frequency bands include an 800 MHz band and a 1900 MHz band. The 1900 MHz band includes two carriers: F1 and F2. The 800 MHz band includes eight carriers: F1-F8. In accordance with one example embodiment, one carrier from each frequency band is identified as being used to transmit a GSR message. In the 1900 MHz band, the identified carrier is the F1 carrier, while in the 800 MHz band, the identified carrier is the F8 carrier.

Table 1 also depicts CDMA channel lists (CCLs) to be sent to mobile stations over various carriers to enable the mobile stations to hash on the channel lists to enable the selection of a carrier from each channel list for use by the respective mobile station. In the example of Table 1, the CCL used in the 1900 MHz band is as follows: {F1, F1, F1, F1, F1, F1, F1, F2}. The same CCL is transmitted over both the F1 and F2 carriers of the 1900 MHz band.

TABLE 1

| | | | Idle Mobile Distribution |
|---|---|---|---|
| 1900 MHz Band | F2 | CCL = F1, F1, F1, F1, F1, F1, F1, F2 | 12.5% |
| | F1 (GSR_to_800 MHz) | CCL = F1, F1, F1, F1, F1, F1, F1, F2 | 0% |
| 800 MHz Band | F8 (GSR_to_1900 MHz) | CCL = F1, F2, F3, F4, F5, F6, F7, F8 | 0% |
| | F7 | CCL = F1, F2, F3, F4, F5, F6, F7, F8 | 12.5% |
| | F6 | CCL = F1, F2, F3, F4, F5, F6, F7, F8 | 12.5% |
| | F5 | CCL = F1, F2, F3, F4, F5, F6, F7, F8 | 12.5% |
| | F4 | CCL = F1, F2, F3, F4, F5, F6, F7, F8 | 12.5% |

TABLE 1-continued

| | | | Idle Mobile Distribution |
|---|---|---|---|
| F3 | CCL = F1, F2, F3, F4, F5, F6, F7, F8 | | 12.5% |
| F2 | CCL = F1, F2, F3, F4, F5, F6, F7, F8 | | 12.5% |
| F1 | CCL = F1, F2, F3, F4, F5, F6, F7, F8 | | 12.5% |

In the 800 MHz band, the following CCL is transmitted over each of the eight carriers F1-F8: {F1, F2, F3, F4, F5, F6, F7, F8}. Note that the CCLs transmitted on both the F1 and F2 carriers of the 1900 MHz band are identical. Similarly, the CCLs transmitted over each of the F1-F8 carriers in the 800 MHz band are also identical. Also, note that the number of carriers in the CCLs of both the 800 MHz band and the 1900 MHz band are identical. As depicted in Table 1, the CCLs in the 1900 MHz band each contains eight carriers, while the CCLs in the 800 MHz band also each contains eight carriers.

In accordance with an embodiment, in the CCL used in the 1900 MHz band, the F1 carrier (over which GSR messages are to be transmitted) is repeated multiple times. In the example of Table 1, F1 is repeated seven times in the CCL of the 1900 MHz band. A consequence of repeating a particular carrier multiple times in the CCL is that this repeated carrier has a greater likelihood of being selected by a mobile station for transmitting an access channel (or to otherwise request access of the mobile communications network). As indicated in the idle mobile distribution column of Table 1, the F2 carrier in the 1900 MHz band is used by a mobile station 12.5% (⅛) of the time for communicating access channels. However, since the F1 carrier is used for transmission of GSR messages by the base station, the F1 carrier in the 1900 MHz band is used 0% of the time by the idle state mobile station for communicating access channels, since the idle state mobile station on the F1 carrier would be redirected by the GSR message to the other frequency band (the 800 MHz frequency band).

In the 800 MHz frequency band, each of the F1-F7 carriers have a 12.5% possibility of being used by a mobile station for communicating access channels. However, the F8 carrier has a 0% selection possibility since the GSR is sent on that carrier.

A different example embodiment is depicted in Table 2 below.

TABLE 2

| | | | Idle Mobile Distribution |
|---|---|---|---|
| 1900 MHz Band | F3 | CCL = F1, F1, F1, F1, F1, F1, F1, F2, F3 | 11.1% |
| | F2 | CCL = F1, F1, F1, F1, F1, F1, F1, F2, F3 | 11.1% |
| | F1 (GSR_to_800 MHz) | CCL = F1, F1, F1, F1, F1, F1, F1, F2, F3 | 0% |
| 800 MHz Band | F8 (GSR_to_1900 MHz) | CCL = F1, F2, F3, F4, F5, F6, F7, F8 | 0% |
| | F7 | CCL = F1, F2, F3, F4, F5, F6, F7, F8 | 11.1% |
| | F6 | CCL = F1, F2, F3, F4, F5, F6, F7, F8 | 11.1% |
| | F5 | CCL = F1, F2, F3, F4, F5, F6, F7, F8 | 11.1% |
| | F4 | CCL = F1, F2, F3, F4, F5, F6, F7, F8 | 11.1% |
| | F3 | CCL = F1, F2, F3, F4, F5, F6, F7, F8 | 11.1% |
| | F2 | CCL = F1, F2, F3, F4, F5, F6, F7, F8 | 11.1% |
| | F1 | CCL = F1, F2, F3, F4, F5, F6, F7, F8 | 11.1% |

In Table 2, the 800 MHz band has the same eight carriers (F1-F8), with GSR sent on the F8 carrier. However, the channel list in the 800 MHz band has nine available carriers, with F8 repeated twice in the channel list of the 800 MHz band.

The 1900 MHz band in Table 2 has three available carriers (F1-F3), where F1 is repeated seven times in the channel list of the 1900 MHz band. Because there are nine available carriers in the channel list in each of the 800 and 1900 MHz bands, the possibility of using a particular carrier (on which GSR is not sent) for communicating access channels is about 11.1%.

Tables 1 and 2 illustrate example configurations that can be maintained in the base station of the mobile communications network. Based on the configuration of Table 1 or 2, each base station knows the channel list to send in the corresponding frequency band, and which carrier (or more generally, which subset of carriers) to use for communicating GSR messages.

In accordance with some embodiments, the mobile stations do not have to be reconfigured to enable distribution across frequency bands. With the configuration of Table 1 or 2, the mobile station would just receive a GSR message over the carrier (or carriers) identified by the base station for communicating GSR messages. On the remaining carriers, the mobile station would not receive GSR messages. A benefit of this is that the redistribution mechanisms implemented in the base stations can be used with conventional mobile stations.

Figure 2:
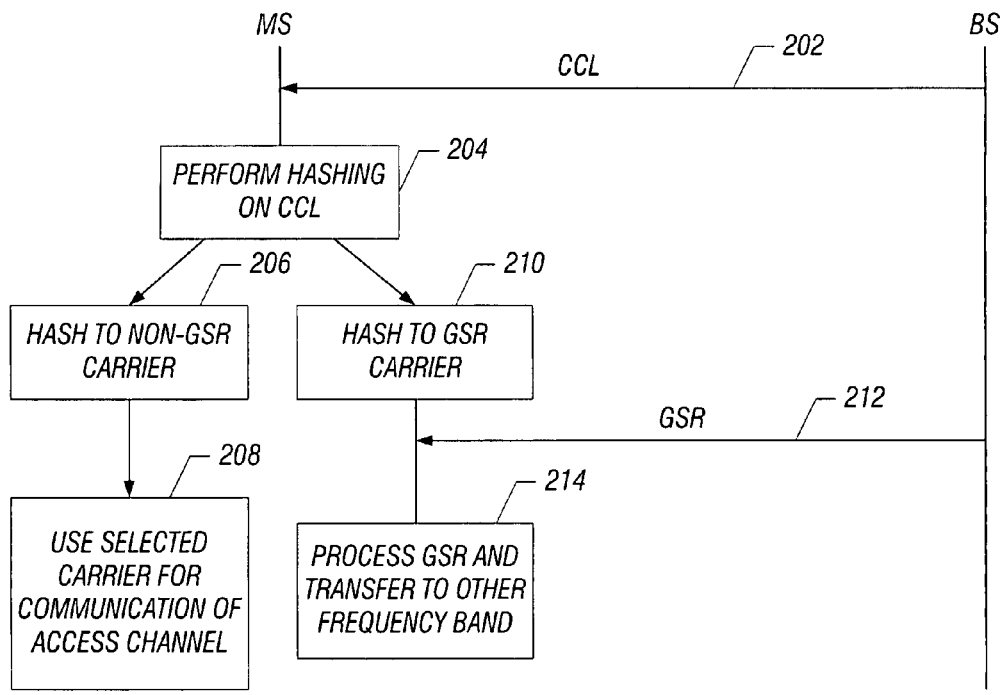
FIG. 2 is a message flow diagram of a process of distributing idle state mobile stations across carriers of multiple frequencies according to a static distribution mechanism, in accordance with an embodiment.

FIG. 2 illustrates a message flow diagram of a process of distributing a mobile station across frequency bands according to the static distribution mechanism. The base station sends (at 202) an overhead message containing the CCL to an idle state mobile station. The overhead message containing the channel list is referred to as a channel list message (e.g., a CDMA channel list message or an extended CDMA channel list message).

In response to receiving the CCL, the mobile station performs hashing (at 204) on the CCL to select one of the available carriers in the CCL. In response to hashing to a non-GSR carrier (at 206), which is a carrier that has not been identified by the base station as one over which a GSR is to be sent, the mobile station uses (at 208) the selected carrier for communication of an access channel. However, in response to hashing to a GSR carrier (at 210), the mobile station receives (at 212) a GSR message and processes (at 214) the received GSR message to transfer the mobile station to the other frequency band indicated by the GSR message. As noted above, the mobile station actually is not aware of which carriers are being used to communicate GSR messages. Thus, hashing to a GSR carrier or to a non-GSR carrier as noted above merely means that the mobile station has hashed to a carrier which the base station will or will not be using for communicating GSR messages.

The static distribution mechanism discussed above is based on statically defining a subset of one or more carriers within each frequency band over which to communicate redirection messages (e.g., GSR messages). The subsets of carriers defined in the multiple frequency bands for carrying GSR messages would not be used by mobile stations for performing access of the mobile communications network. Thus, with the static distribution mechanism, each frequency band has to have at least two available carriers to allow for proper operation.

In an alternative embodiment, a dynamic distribution mechanism is used in which proper operation can be achieved even if one or more of the multiple frequency bands has just one available carrier. With the dynamic distribution mechanism, the transmission of redirection messages (e.g., GSR messages) for transferring mobile stations to different frequency bands is disabled until a base station detects that a load condition indicates that the transfer of mobile stations to other bands would be desirable. In some embodiments, the detected load condition is the load on the access channel of a particular carrier. If the base station detects that usage of the access channel on a particular carrier exceeds a threshold (or otherwise crosses a threshold), then the transmission of redirection messages is enabled for some predefined time interval (referred to as a GSR-enabled time interval or burst). During these GSR-enabled time intervals, the base station transmits GSR messages periodically (e.g., once every 1.25 milliseconds or some other time interval). In this manner, the base station is able to dynamically enable transmission of redirection messages for transferring mobile stations to different frequency bands on an as-needed (dynamic) basis. During time periods outside these predefined time intervals, transmission of GSR on the particular carrier is disabled.

Figure 3:
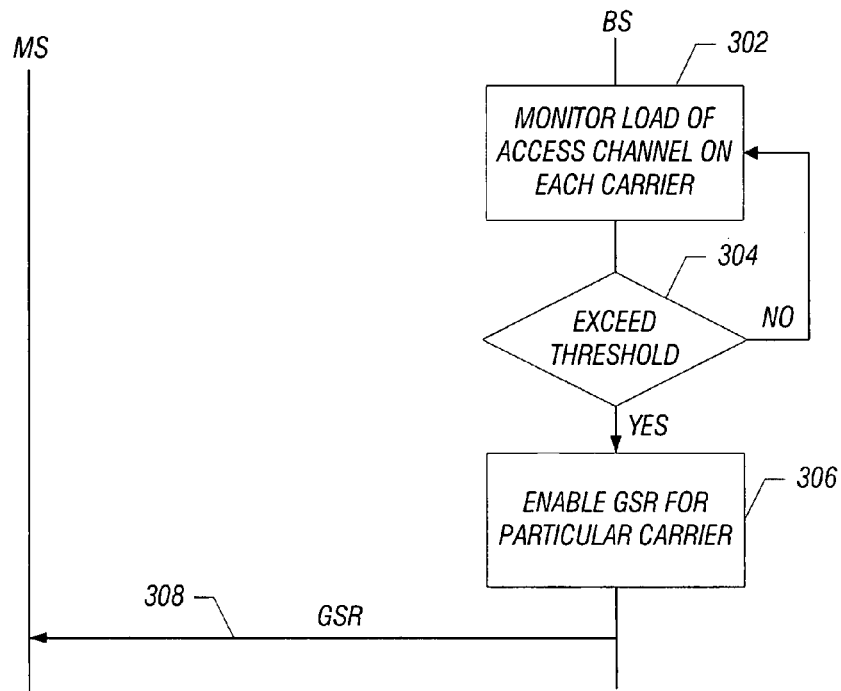
FIG. 3 is a message flow diagram of a process of distributing mobile stations according to a dynamic distribution mechanism, in accordance with another embodiment.

FIG. 3 is a message flow diagram of a process according to the dynamic distribution mechanism. The base station monitors (at 302) the load of the access channel on each carrier. The base station determines if the usage of any access channel exceeds a threshold (at 304). If usage of an access channel on a particular carrier is exceeded, as determined at 304, then the transmission of GSR messages is enabled (at 306) for the particular carrier. Enabling of GSR for the particular carrier is for some predefined time interval.

In one example embodiment, the predefined time interval can be based on a MAX_SLOT_CYCLE_INDEX parameter that is stored at the base station (and more particularly, at the BTS). The MAX_SLOT_CYCLE_INDEX parameter defines the maximum slot cycle index that can be set by a mobile station, where the slot cycle index specifies a time period after which a mobile station has to wake up to monitor the paging channel (or other channels) that may be transmitted by the base station. The predefined time interval during which GSR is enabled can be based on some multiple (a value greater than zero) of the value of MAX_SLOT_CYCLE_INDEX stored in the BTS. In other implementations, the predefined time interval for enabling GSR can be based on other parameters, or can be some arbitrary value that is coded into each base station.

Once GSR is enabled for a particular carrier, GSR messages are sent (at 308) from the base station to mobile stations once every predefined time period over the particular carrier. In some implementations, each GSR message can specify one or more access overload classes. An access overload class can be based on some portion of the identifier (e.g., MIN or IMSI of a mobile station), such as the last few digits of the identifier of the mobile station. Thus, each access overload class can include some subset of mobile stations that are within the coverage area of a base station. By specifying one or more access overload classes in the GSR message, the GSR message is targeted to the subset or subsets of mobile stations associated with the specified access overload class(es). In a different embodiment, the GSR messages sent at 308 do not specify access overload classes.

The various tasks performed by various nodes (base stations, mobile stations) discussed above can be performed by software executable on the nodes. Instructions of such software are loaded for execution on a processor. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices (such as storage 117 and 121 in FIG. 1), which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a wireless communications network having plural frequency bands, comprising:
   in each of the plural frequency bands, identifying a predefined subset of carriers not used for access channels in the corresponding frequency band over which redirection messages are to be sent to idle mobile stations;
   sending an access channel list to the idle mobile stations, said access channel list including at least one carrier from the predefined subset of carriers; and
   sending the redirection messages over identified predefined subsets of carriers in the plural frequency bands to redirect the idle state mobile stations from one frequency band to another frequency band when the idle mobile stations select one of the carriers in the predefined subset from the access channel list.

2. The method of claim 1, further comprising sending channel lists to the idle state mobile stations over the carriers of the plural frequency bands, wherein each channel list indicates available carriers.

3. The method of claim 2, wherein sending the channel lists comprises sending code division multiple access (CDMA) channel lists in overhead messages to the idle state mobile stations.

4. The method of claim 2, wherein sending the channel lists to the idle state mobile stations over the carriers of the plural frequency bands comprises sending channel lists each having a same number of available carriers.

5. The method of claim 1, wherein the predefined subset of carriers in one of the frequency bands over which redirection messages are to be sent includes one carrier.

6. The method of claim 1, wherein sending the redirection messages comprises sending global service redirection (GSR) messages that are received by the idle state mobile stations.

7. The method of claim 1, wherein sending the redirection messages over the identified predefined subsets of carriers in the plural frequency bands comprises sending the redirection messages periodically.

8. The method of claim 1, wherein the identifying and sending are performed by a base station.

9. The method of claim 1, wherein the identifying and sending are performed by a base transceiver station (BTS).

10. The method of claim 1, wherein the access channel is used by each mobile station to originate a call session, respond to a page, or perform registration.

11. A base station comprising:
an interface to mobile stations; and
a processor to:
- detect a usage of an access channel on a carrier communicated between the base station and the mobile stations;
- in response to detecting the usage of the access channel crossing a threshold, enable transmission of redirection messages for a predefined time interval; and
- send the redirection messages over the carrier during the predefined time interval to the mobile stations.

12. The base station of claim 11, wherein the processor is to disable transmission of the redirection messages over the carrier after the predefined time interval.

13. The base station of claim 11, wherein detecting the load condition of the carrier comprises monitoring usage of an access channel by mobile stations on the carrier.

14. The base station of claim 11, wherein enabling transmission of the redirection messages comprises enabling transmission of global services redirection (GSR) messages.

15. The base station of claim 11, wherein sending the redirection messages comprises sending the redirection messages to a subset of the mobile stations, and wherein each redirection message specifies one or more access overload classes to define the subset of mobile stations that are to respond to the redirection messages.

16. The base station of claim 11, comprising a base transceiver station (BTS), wherein the interface and the processor are part of the BTS.

17. The base station of claim 11, wherein the processor is configured to further disable transmission of redirection messages in response to detecting that the load has not crossed the threshold.

18. An article comprising at least one non-transitory computer-readable storage medium containing instructions that when executed cause a base station to:
- in each of plural frequency bands, identify a predefined subset of carriers not used for access channels in corresponding frequency band over which redirection messages are to be sent to idle mobile stations;
- sending an access channel list to idle mobile stations, said access channel list including at least one carrier from the predefined subset of carriers; and
- send the redirection messages over the identified predefined subsets of carriers in the plural frequency bands to redirect the idle state mobile stations from one frequency band to another frequency band when the idle mobile stations select one of the carriers in the predefined subset from the access channel list.

19. The article of claim 18, wherein the instructions are executed cause the base station to further send channel lists to the idle state mobile stations over the carriers of the plural frequency bands, wherein each channel list indicates available carriers.

20. The article of claim 18, wherein the access channel is used by each mobile station to originate a call session, respond to a page, or perform registration.

\* \* \* \* \*